United States Patent
Kerpez et al.

(10) Patent No.: US 8,509,166 B2
(45) Date of Patent: Aug. 13, 2013

(54) SYSTEM AND METHOD FOR RESOURCE ALLOCATION OF A LTE NETWORK INTEGRATED WITH FEMTOCELLS

(75) Inventors: Kenneth J. Kerpez, Long Valley, NJ (US); Tian Lan, Princeton, NJ (US); Kaustubh Sinkar, New Brunswick, NJ (US); Latha Kant, Basking Ridge, NJ (US)

(73) Assignee: TTI Inventions D LLC, Wilmington, DE (US)

( * ) Notice: Subject to any disclaimer, the term of this patent is extended or adjusted under 35 U.S.C. 154(b) by 695 days.

(21) Appl. No.: 12/695,661

(22) Filed: Jan. 28, 2010

(65) Prior Publication Data

US 2011/0183678 A1    Jul. 28, 2011

(51) Int. Cl.
*H04W 4/00* (2009.01)
*H04W 72/00* (2009.01)

(52) U.S. Cl.
USPC ...................................... 370/329; 455/452.2

(58) Field of Classification Search
None
See application file for complete search history.

(56) References Cited

U.S. PATENT DOCUMENTS

| | | | | |
|---|---|---|---|---|
| 2004/0081127 | A1* | 4/2004 | Gardner et al. | 370/338 |
| 2005/0064872 | A1* | 3/2005 | Osseiran et al. | 455/452.1 |
| 2008/0045272 | A1* | 2/2008 | Wang et al. | 455/561 |
| 2009/0073926 | A1* | 3/2009 | Lee et al. | 370/329 |
| 2009/0221295 | A1* | 9/2009 | Sahin et al. | 455/450 |

OTHER PUBLICATIONS

Egorova et al., "Bandwidth-sharing in overloaded networks", Mar. 19-21, 2008, Information Sciences and Systems, pp. 36-41.*
Egorova et al., "Bandwidth-sharing in overloaded networks," International Sciences and Systems, Mar. 27, 2008, pp. 36-41, accessed Mar. 16, 2011.
International Search Report for PCT/US11/00127, mailed Apr. 4, 2011.
Chandrasekhar, V., et al., "Femtocell Networks: A Survey" IEEE Communications Magazine, vol. 46, No. 9, pp. 59-67, Sep. 2008.
Karlsson, R., "Radio Resource Sharing and Capacity of Some Multiple Access Methods in Hierarchical Cell Structures", IEEE Vehicular Technology Conference, vol. 5, pp. 2825-2829, Amsterdam, Sep. 1999.
Chandrasekhar, V., et al., "Upink Capactiy and Interference Avoidance for Two-Tier Femtocell Networks", IEEE Transactions on Wireless Communications, vol. 8, issue 7, Jul. 2009.
Astely, D., et al., "LTE: The Evolution of Mobile Broadband", IEEE Communications Magazine, vol. 47, issue 4, Apr. 2009.

(Continued)

*Primary Examiner* — Clemence Han

(57) ABSTRACT

A resource scheduling and power allocation technique is provided for a LTE radio network integrated with femtocells. The technique utilizes a tri-phase approach that includes a stochastic geometric model of an exemplary radio network that generates a channel attenuation matrix for each channel at each PRB. A resource scheduling and power allocation procedure determines a near optimal assignment of mobile user to PRBs based on the channel attenuations, potential data rates, and transmit power subject to maximizing the data rates in accordance with a fairness objective. A discrete-event simulation procedure simulates the end-to-end transmission of the data packets in a packet-switch network in accordance with the assignments to analyze the behavior of the overall network.

17 Claims, 5 Drawing Sheets

(56) References Cited

OTHER PUBLICATIONS

Lui, R., et al., "Low Complexity Near-Optimal Spectrum Balancing Ericsson, "LTE—an introduction", Ericsson Technical Report 284 23-3124, Uen Rev B, available at www:ericsson:com=technology=whitepapers=lteoverview:pdf, Jun. 2009. for Digital Subscriber Lines", Proceedings of IEEE International Conference on Communications (ICC), Seoul, Korea, May 2005.

Cendrillon, R., et al., Autonomous Spectrum Balancing for Digital Subscriber Lines, IEEE Transactions on Signal Processing, vol. 55, No. 8, pp. 4241-4257, Aug. 2007.

Kishore, S., et al., "Uplink User Capacity in a CDMA System with Hotspot Microcells: Effects of Finite Transmit Power and Dispersion", IEEE Transactions on Wireless Communications, vol. 5, No. 2, pp. 417-426, Feb. 2006.

Luo, Z-Q., et al., "Dynamic Spectrum Management: Complexity and Duality," IEEE Journal of Selected Topics in Signal Processing, vol. 2, No. 1, pp. 57-73, Feb. 2008.

Yu, W., et al., "Distributed Multiuser Power Control for Digital Subscriber Lines", IEEE Journal on Selected Areas of Communications, vol. 20, No. 5, pp. 1105-1115, Jun. 2002.

Kelly, F.P., et al., "Rate Control in Communication Networks: Shadow Prices, Proportional Fairness and Stability", Journal of the Operational Research Society, vol. 49, pp. 237-252, 1998.

Thanabalasingham, T., et al., "Joint Allocation of Subcarriers and Transmit Powers in a Multiuser OFDM Cellular Network", IEEE International Conference on Communications, pp. 269-274, Jun. 2006.

Zhang, Z., et al., "Opportunistic Scheduling for OFDM Systems with Fairness Constraints," EURASIP Journal on Wireless Communications and Networking, vol. 2008, Article ID 215939, Jan. 2008.

Majjigi, V., et al., "Persistent Resource Allocation in OFDMA Networks for Real-Time and Non-Real-Time Traffic", Asilomar Conference on Signals, Systems and Computers, pp. 280-284, Pacific Grove, CA, Nov. 2007.

Khattak, S., et al., "SIR based Adaptive Subchannel Allocation in OFDMA Cellular System", Mobile and Wireless Communications Summit, pp. 1-5, Budapest, Jul. 2007.

Maciel, T.F., et al., "A resource allocation strategy for SDMA/OFDMA systems", IST Mobile and Wireless Communications Summit 2007, pp. 1-5, Budapest, Jul. 2007.

Yu, W., et al., "Dual Methods for Nonconvex Spectrum Optimization of Multicarrier Systems", IEEE Transactions on Communications, vol. 54, No. 7, pp. 1310-1322, Jul. 2006.

Bonald, T., et al., "Impact of Fairness on Internet Performance", Proceedings of ACM Sigmetrics, pp. 82-91, Jun. 2001.

Huang, J., et al. "Joint Scheduling and Resource Allocation in Uplink OFDM Systems", IEEE Transactions on Wireless Communications, vol. 8, No. 1, Jan. 2009.

Mo, J., et al., "Fair End-to-end Window-based Congestion Control"; IEEE/ACM Transactions Networking, vol. 8, No. 5, pp. 556-567, Oct. 2000.

Huang, J., et al., "Joint Scheduling and Resource Allocation in Uplink OFDM Systems for Broadband Wireless Access Networks", IEEE Journal on Selected Areas in Communications, vol. 27, No. 2, pp. 226-234, Feb. 2009.

IST-WINNER II Deliverable 1.1.2 v.1.2, "WINNER II Channel Models", IST-WINNER2, Technical Report, 2007 (http://www.istwinner.org/deliverables.html).

IST-WINNER II Deliverable 1.1.2 v.1.0, "WINNER II Channel Models", IST-WINNER2, Technical Report, 2007 (http://www.istwinner.org/deliverables.html).

Chiang, M., et al., "Power Control in Cellular Networks" Now Publishers Inc, 2008.

3GPP TR 25.814, "Physical layer aspect for evolved Universal Terrestria Radio Access (UTRA)", 2008.

3GPP TS 36.101, "Evolved Universal Terrestrial Radio Access (EUTRA); User Equipment (UE) radio transmission and reception", 2009.

3GPP TS 36.104, "Evolved Universal Terrestrial Radio Access (EUTRA); Base Station (BS) radio transmission and reception", 2009.

3GPP TS 36.201, "Evolved Universal Terrestrial Radio Access (EUTRA); Long Term Evolution (LTE) physical layer; General description", 2009.

* cited by examiner

SYSTEM AND METHOD FOR RESOURCE ALLOCATION OF A LTE NETWORK INTEGRATED WITH FEMTOCELLS

FIELD OF THE INVENTION

The present invention relates generally to the field of wireless data communication networks, and more particularly to resource allocation within a long term evolution (LTE) network integrated with femtocells.

BACKGROUND

Long term evolution (LTE) is a high performance radio interface for cellular mobile communication systems. LTE boasts of performance peak rates of at least 100 Mbps for the downlink transmissions, 50 Mbps for the uplink transmissions, and radio access network round trip times less than 10 ms. It has the advantage of high throughput, low latency, and a simple architecture with low operating costs.

The allocation of resources, such as scheduling and transmit power, in a radio network has a significant impact on the performance of a wireless communication system. Scheduling pertains to the allocation of a time and frequency unit to a mobile station. Power allocation pertains to setting transmit power levels in an efficient manner. The allocation of the transmit power determines the data rate of transmission to a scheduled mobile station. The manner in which these resources are allocated affects the overall throughput and transmission rates that can be achieved.

Conventional resource allocation techniques are not suitable for a LTE network. The conventional techniques typically schedule in units that contain a signal subcarrier and one time slot. The basic radio resource in LTE is a Physical Resource Block (PRB) which contains a group of subcarriers and time slots. User scheduling in LTE networks is performed through the allocation of a PRB rather than through the allocation of a single subcarrier and time slot. This makes user scheduling in a LTE network more complex and computationally burdensome.

Additionally, existing resource allocation techniques typically focus on maximizing the total network throughput or system capacity. The notion of fairness or fair resource allocation among users is often not considered which can result in sacrificing the transmission of other users. Accordingly, there is a need for a more efficient resource allocation.

SUMMARY

This Summary is provided to introduce a selection of concepts in a simplified form that are further described in the Detailed Description below. This Summary is not intended to identify essential features of the invention or claimed subject matter, nor is it intended to be used in determining the scope of the claimed subject matter.

The present invention pertains to a technology for power control and scheduling in a LTE network integrated with femtocells under the constraints of a quality of service using fairness objectives. The technology utilizes a tri-phase approach which includes a LTE air interface model procedure, a resource scheduling and power allocation procedure, and a discrete event simulation procedure.

The LTE air interface model is a stochastic geometric model of an exemplary radio network including different propagation scenarios, physical propagation characteristics, and conditions encountered by a radio network in the field. A stochastic geometric framework is used to model the random spatial distribution of users, femtocells, and buildings. After deployment, the physical channel attenuations are generated for each time slot and subcarrier to capture antenna sectoring, path loss, shadow fading, and multi-path fading for the modeled network scenarios. The model produces a channel attenuation matrix $H_{b_i, i, t, f}$ that captures the channel attenuation for each channel $(b_i, i)$ at each PRB $(t, f)$.

The resource scheduling and power allocation procedure determines a near optimal assignment of users to physical resource blocks (PRBs) and the transmit power for each scheduled user. The user scheduling and power allocation assignment is decomposed into two separate problems that are solved simultaneously. Power allocations are made using a water-filling technique with fixed scheduling. The scheduling is then updated to maximize the data rates while meeting fairness constraints.

The discrete event simulation model simulates the end-to-end packet-by-packet transmissions throughout the entire network so that the performance of the network can be analyzed. The analysis studies the network throughput, delays; and the parameters impacting these factors.

Design tradeoffs can be made to the LTE air interface model and the entire process rerun so that the effects of the design can be more thoroughly studied in a simulated network environment. These studies are useful for the planning and design of LTE network architectures integrated with femtocells.

BRIEF DESCRIPTION OF THE DRAWINGS

The subject matter disclosed is illustrated by way of example, and not by way of limitation, in the figures of the accompanying drawings in which the like reference numerals refer to similar elements and in which.

DETAILED DESCRIPTION

Figure 1:
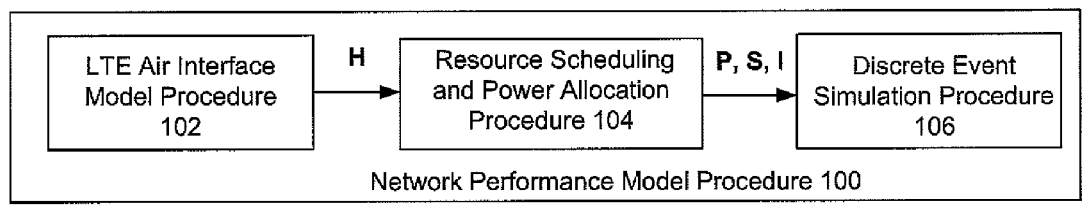
FIG. 1 is a schematic block diagram of the tri-phase modeling approach used in an embodiment.

FIG. 1 is an overview of the methodology used in an embodiment of the present invention. There is shown a network performance model procedure 100, including a LTE air interface model procedure 102, the resource scheduling and power allocation procedure 104, and a discrete-event simulation procedure 106.

The LTE air interface model procedure 102 is a stochastic geometric model of an exemplary radio network including different propagation scenarios, physical propagation characteristics, and conditions encountered by a radio network in the field. In an embodiment, a stochastic geometric framework is used to model the random spatial distribution of users, femtocells, and buildings. After deployment, the physical channel attenuations are generated for each time slot and subcarrier to capture antenna sectoring, path loss, shadow fading, and multi-path fading for the modeled network scenarios. The model produces a channel attenuation matrix $H_{b_i,i,t,f}$ that captures the channel attenuation for each channel $(b_i, i)$ at each PRB $(t, f)$. The channel attenuation matrix H is used in the resource scheduling and power allocation procedure 104.

The resource scheduling and power allocation procedure 104 determines a near optimal assignment of users to physical resource blocks (PRBs) and the transmit power for each scheduled user. The user scheduling and power allocation assignment is decomposed into two separate problems that are solved simultaneously. Power allocations are made using a water-filling technique having fixed scheduling. The scheduling is then updated to maximize the data rates while meeting fairness constraints. The interference between users is then determined and captured in an interference matrix I.

The discrete event simulation procedure 106 simulates the end-to-end packet transmissions of the entire network so that the performance of the network can be analyzed. The simulation procedure 106 utilizes the LTE air interface model 102, the channel attenuation and interference matrices, H and I, the power allocation and user scheduling decision matrices, P and S, to study the behavior of the network.

Figure 2:
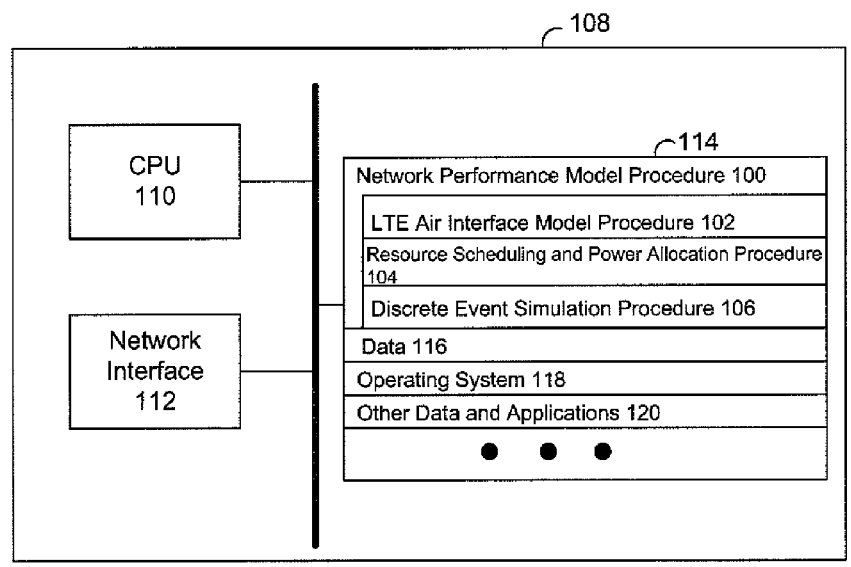
FIG. 2 is a schematic diagram of a computing device performing the network performance model procedure in accordance with an embodiment.

Referring to FIG. 2, there is shown a computing device 108 used to execute the network performance model procedure 100. The computing device 108 can be any device capable of executing programming instructions, such as without limitation, computer, laptop, PDA, smart phone, and the like. Alternatively, the computing device 108 can be incorporated into a network element, such as an eNodeB.

The computing device 108 can include a processor or CPU 110, a network interface 112, and a memory 114. The memory 114 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 114 can also include one or more external storage devices or remotely located storage devices. The memory 114 can contain instructions and data as follows:

network performance model procedure 100 including:
LTE air interface model procedure 102;
Resource scheduling and power allocation procedure 104;
Discrete event simulation procedure 106;
various data and/or data structures used in the procedures 116;
an operating system 118; and
other data and applications 120.

Attention now turns to a discussion of an exemplary communication system for use in an embodiment.

Figure 3:
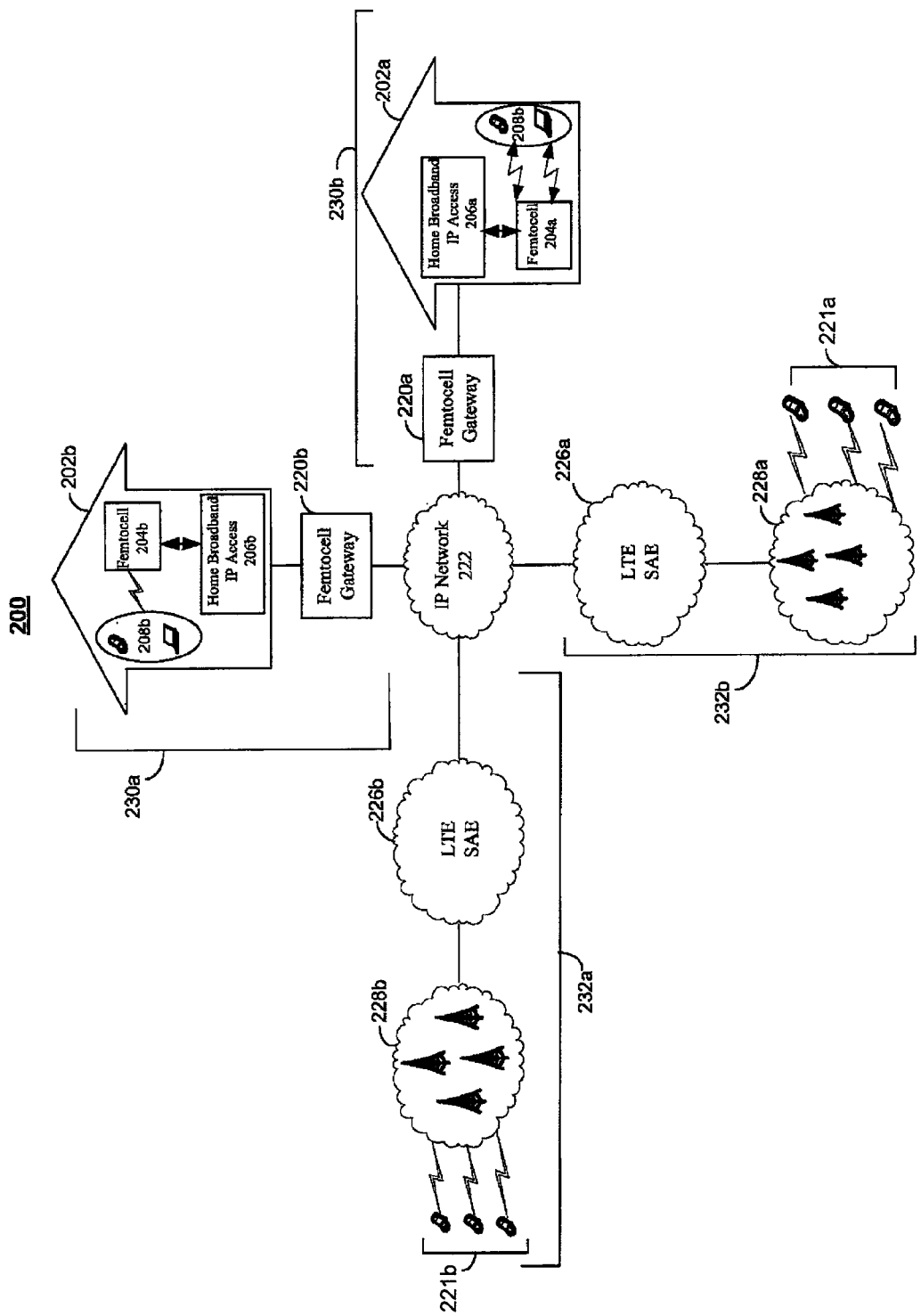
FIG. 3 is a schematic diagram of a cellular wireless communications system using a LTE network integrated with femtocells in accordance with an embodiment.

FIG. 3 shows an embodiment of a communications system 200 that can contain one or more femtocell communication paths 230a,b and one or more LTE communication paths 232a,b. Each femtocell communication path 230 a,b can have one or more interior structures 202a,b coupled to a femtocell gateway 220 a,b that in turn is coupled to an IP network 222. Each house, building, or interior structure 202a,b contains one or more femtocell base stations (or femtocell) 204a,b connected via a first wireless communications link to one or more user equipment devices (UE) 208a,b and to a home broadband IP access mechanism 206a,b via a second wireless communications link. The femtocell is a small base station that is typically used within a home or small business. The femtocell is a short range, low cost and low power base station installed by a consumer for better indoor voice and data reception. Due to their short transmit-receive distance, femtocells achieve a higher signal-to-interference-plus-noise ratio (SINR) resulting in improved reception and reduced interference.

The first and second wireless communications links can utilize any wireless communication technology, such as without limitation, radio frequency, microwave, or infrared communications. The user equipment 208 a,b can be any type of mobile device capable of communicating with the femtocell over the wireless communication link, such as without limitation, cellular phone, pager, PDA, computer, laptop, smart phone, and the like.

The home broadband IP access link 206a,b can be any wired or wireless broadband link capable of high data rate Internet access (e.g., digital subscriber line, cable, passive optical network or other access technology). Each home broadband IP access link 206a,b is coupled to a femtocell gateway 220a,b which in turn is coupled to the IP network 222. The femtocell gateway is an access point between several femtocells and the IP network 222.

The LTE communication path 232a,b utilizes the LTE radio interface. LTE is a 3GPP standard that incorporates Single Carrier-Frequency Division Multiple Access (SC-FDMA) for uplink transmissions and Orthogonal Frequency Division Multiple Access (OFDMA) for downlink transmissions. In OFDMA, users are allocated a group of subcarriers for a predetermined amount of time, which is otherwise known as a physical resource block or PRB. Typically, the scheduling function is handled at the LTE base station.

Referring to FIG. 3, the LTE communication path 232a,b can contain one or more of the following elements: mobile devices 221a,b; LTE base stations 228a,b; and a LTE System Architecture Evolution (SAE) 226a,b. The mobile devices 221a,b can be any type of cellular or wireless device, such as without limitation, cellular phones, computers, laptops, smart phones, PDAs, and the like. The mobile devices are otherwise referred to herein as mobile stations (MS) or user equipment (UE). The mobile devices are coupled to LTE base stations 228a,b through a wireless communication link. The base stations 228 a,b are known as eNodeBs and affect the protocols for the support of the packet-switched LTE services. The base stations 228a,b are connected to a LTE SAE 226a,b which is the core network or radio backhaul. The LTE SAE 226 a,b, is connected to the IP network 222. The elements of the LTE communication path 232a,b operate in accordance with well-known the 3GPP standards.

Attention now turns to a discussion of the components of the network performance model procedure 100.

LTE Air Interface Model

The LTE air interface model procedure 102 generates the radio channel attenuations for an exemplary propagation scenario and environment that includes the LTE radio interface integrated with femtocells. The LTE air interface model procedure 102 is a geometry-based stochastic radio channel model developed using the WINNER II project radio channel models.

The WINNER II models cover a broad spectrum of radio propagation scenarios and environments, including indoor, outdoor-to-indoor, indoor-to-outdoor, macrocell, urban microcell, and the like. The WINNER II channel models are based on a generic channel modeling approach allowing a user to vary the modeling environment, such as the number of antennas, the antenna configuration, the geometry, and the antenna beam pattern, and the like. Further details of these models can be found at 1 ST-WINNER II Deliverable 1.1.2 v 1.2, "WINNER II Channel Models", 1ST-WINNER2, Technical Report, 2007, (http://www.ist-winner.org).

The channel parameters for the physical layer were chosen in accordance with the following LTE specifications: (1) 3GPP TR 25.814 ("Physical layer aspect for evolved Universal Terrestrial Radio Access (UTRA)"); (2) 3GPP TR 36.101 ("Evolved Universal Terrestrial Radio Access (E-UTRA): User Equipment (UE) radio transmission and reception"); (3) 3GPP TR 36.104 (Evolved Universal Terrestrial Radio Access (E-UTRA): Base Station (BS) radio transmission and reception"); and (4) 3GPP TR 36.201 ("Evolved Universal Terrestrial Radio Access (E-UTRA): Long Term Evolution (LTE) physical layer).

Certain parameters were chosen using data or guidelines from specific tables of the WINNER II models and in particular, the following tables: (1) Table 4-1 "Ray offset angles within a cluster, give 1° rms angle spread" (hereinafter referred to as "Table 4-1"); Table 4-2 "Sub-cluster information for intra cluster delay spread clusters" (hereinafter referred to as "Table 4-2"); and Table 4-5 "Table of parameters for generic models" (hereinafter referred to as "Table 4-5").

Table 1 below lists key mathematical notations and their meaning as used herein.

Figure 4:
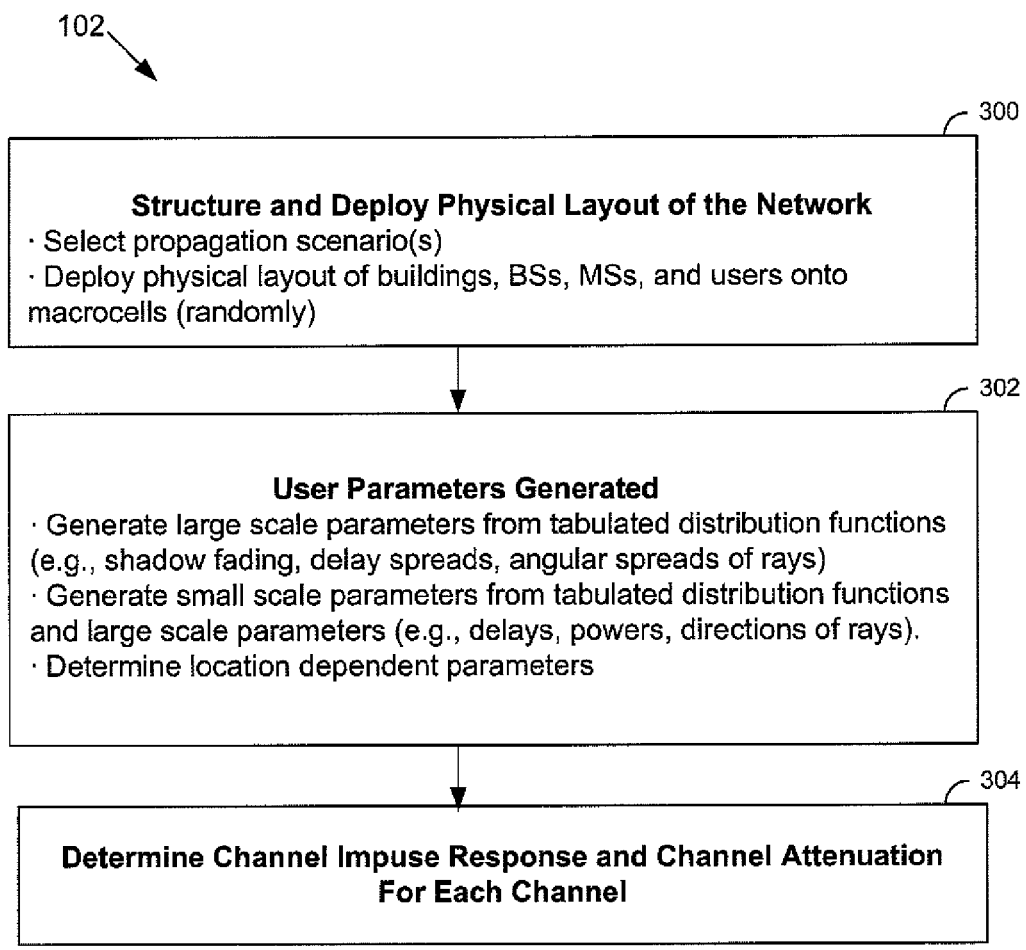
FIG. 4 is a flow chart of the steps used in the LTE air interface model procedure in accordance with an embodiment.

Referring to FIG. 4, the physical layout of the modeled radio network is created (step 300). The user can select one or more propagations scenarios and construct a network environment including houses or buildings, femtocell base stations (BS), macrocell base stations, and mobile stations (MS or UE) which are randomly placed in a hexagonal grid containing deployed macrocells. A number of houses, $N_{house}$, each of a size w×w, are uniformly distributed over the area. A femtocell base station can be placed in each house with a uniform distribution and serve a number of indoor mobile stations in the house, $N_{UE, in}$. A number of outdoor mobile stations, $N_{UE, out}$, are uniformly placed over the area as well.

After the deployment, there are $N_{UE}=N_{UE, in} \cdot N_{house} + N_{UE, out}$ mobile stations and $N_{BS}=N_{house}+N_{site}$ base stations in the network which result in $N_{channel}=N_{UE} \cdot N_{BS}$ communication channels. The channels are denoted as $i=1, \ldots, N_{channel}$, where each channel i represents a base station-mobile station pair $(s_i, m_i)$ or $(b_i, i)$.

Next, the user parameters are generated (step 302). The WINNER II models generate user parameters based on the physical layout and propagation scenario created in step 300. These parameters are classified into two sets: large scale and small scale parameters. The large scale parameters include the following: delay spread and distribution; angle of departure spread and distribution; angle of arrival spread and distribution; shadow fading standard deviation; and ricean K-factor. The large scale parameters are drawn randomly from tabulated distribution functions. The small scale parameters include the following: scaling parameters for delay distribution; cross-polarization power ratios, number of clusters, cluster angle spread and distribution, cluster angle spread of arrival, etc. The small scale parameters are drawn randomly from tabulated distribution functions and random LS parameters.

In addition, location dependent parameters are generated (step 302). The location dependent parameters can include $d_i$, $\phi_i$, $d_{out, i}$, and $d_{in,i}$. For each channel i, $d_i$ denotes the distance from base station $s_i$ to mobile station $m_i$ and $\phi_i$ denotes the departure or arrival angle at base station $s_i$. The distance $d_{out, i}$ is the distance from base station $s_i$ to the wall next to the mobile station location when the mobile station location is placed outdoors. The distance $d_{in,i}$ is the perpendicular distance from the wall to the mobile station, and $\theta_i$ is the angle between the line-of-sight (LOS) to the wall and a unit vector normal to the wall.

Figure 5:
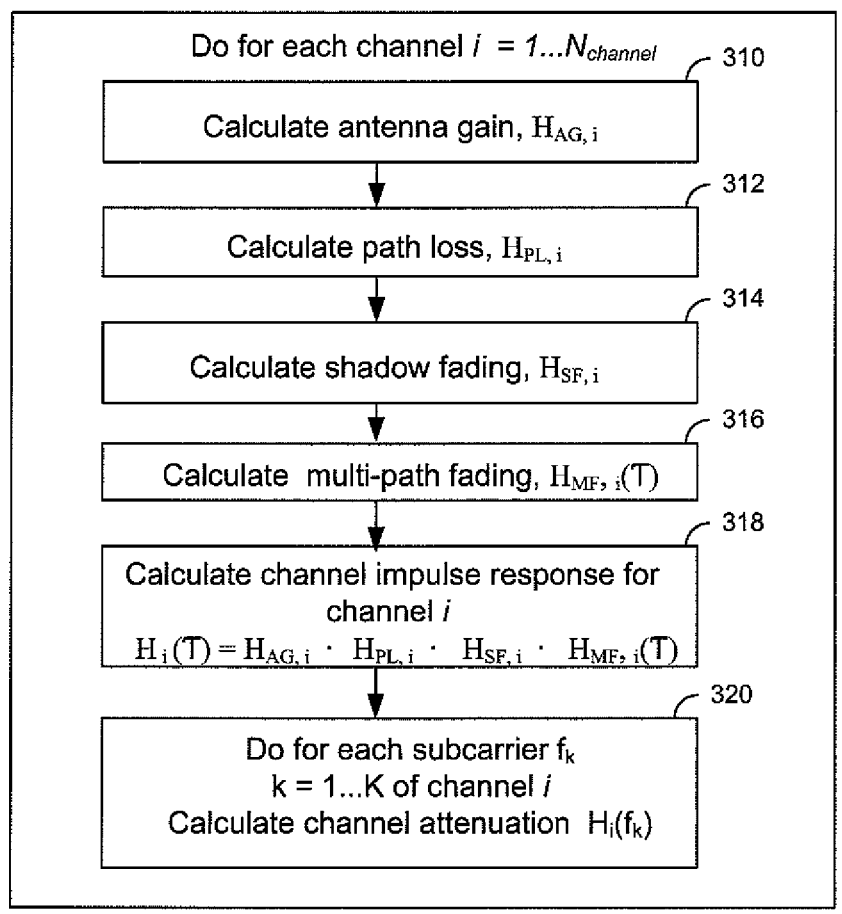
FIG. 5 is a flow chart of the steps used in the channel attenuation calculation in accordance with an embodiment.

In step 304, the channel impulse response (CIR) is computed for each channel i and the channel attenuation for each subcarrier $f_k$ in channel i. FIG. 5 shows the steps used to make these calculations.

In short, the CIR for each channel is computed as a function of four components: antenna gain, $H_{AG, i}$; path loss, $H_{PL, i}$; shadow fading, $H_{SF, i}$; and multi-fading, $H_{MF, i}(\tau)$. The CIR for each channel i is represented mathematically as follows:

$$H_i(\tau) = H_{AG,i} \cdot H_{PL,i} \cdot H_{SF,i} \cdot H_{MF,i}(\tau), \text{ where } i \text{ represents } (b_p i).$$

Once the CIR is known for a particular channel i, then the channel attenuation is computed for each subcarrier.

Attention now turns to a discussion of how each of the four components is computed.

Antenna Gain

Referring to FIG. 5, the antenna gain for channel i is computed in step 310. An omni-directional radiation pattern with antenna gain is used to represent the antenna gain. A mobile station's antenna gain is represented by, $A_{MS}=0$ dBi and the femtocell base station's antenna gain is represented by, $A_{femto}=0$ dBi. A macrocell's base station antenna gain, $A_{macro}$, depends on the propagation scenario (e.g., rural or suburban area), center frequency, and antenna height, and can range from 12 dBi to 18 dBi. Thus, the aggregate antenna gain $H_{AG,i}$ for channel i is determined by the BS-MS pair, $(s_i, m_i)$, and is as follows:

$$H_{AG,i} = 10^{1/10(A_{macro} \cdot 1\{S_i \text{ is macro--BS}\} + A_{femto} \cdot 1\{S_i \text{ is femto--BS}\})},$$

where $1\{\cdot\}$ is an indicator function.

Path Loss

The path loss for channel i is computed in step 312. The path loss is the attenuation of the signal as the mobile station moves away from the base transceiver station. The path loss models are based on different propagation scenarios, such as indoor small office, large indoor hall, suburban, bad urban micro-cell, LOS, NLOS, etc. The path loss models were formulated for the following propagation scenarios: outdoor path loss; indoor small office; outdoor to indoor; and indoor to outdoor. The models were applied within the frequency range of 2 to 6 GHz and for different antenna heights.

The outdoor path loss for (line-of-sight) NOS and (non-line-of-sight) NLOS is as follows:

$$PL_{LOS}^{out} = \begin{cases} 23.8 \log 10(d_i) + 41.2 + 20 \log 10\left(\frac{f_c}{5.0}\right), \\ 40.0 \log 10(d_i) + 11.65 - 16.2 \log 10(h_{BS} h_{MS}) \end{cases}$$

$$PL_{NLOS}^{out} = [44.9 - 6.55 \log 10(h_{BS})] \cdot \log 10(d_i) + 31.46 + 5,$$

where $d'=4(h_{BS}-1)(h_{MS}-1) f_c/c$ is the breakpoint distance,
$f_c$ is the center frequency in Hz,
c is the speed of light,
$h_{MS}$ is the antenna height of the mobile station,
$h_{Bs}$ is the antenna height of the base station,
$10 \leq d_i \leq 5000$, $h_{BS}=25$, and $h_{MS}=1.5$.

The indoor small office path loss for NOS and NLOS is as follows:
$PL_{LOS}^{in} = 18.7 \log 10(d_i) + 46.8 + 20 \log 10(f_c/5.0)$
$PL_{NLOS}^{in} = 20 \log 10(d_i) + 46.4 + 12 n_{wall} + 20 \log 10(f_c/5.0)$,
where $n_{wall}$ is the number of walls between BS and MS, is $$3 \leq d_i \leq 100, h_{BS} = h_{MS} = 1 - 2.5.$$

The outdoor to indoor path loss for NLOS is as follows:

$$PL_{NLOS}^{out-in} = PL_1 + PL_{12} + PL_2$$
$$= PL_{NLOS}^{out}(d_{in,i} + d_{out,i}) + [14 + 15(1 - \cos(\vartheta))^2]$$

where $PL_1 = PL_{NLOS}^{out}$ is the outdoor NLOS,
$PL_{12}$ is the path loss through the wall as a function of the penetration angle,
$PL_2$ is the indoor path loss,
$h_{BS} = 10$, $h_{MS} = 3n_{floor} + 1.5$, $n_{floor}$ is the number of floors.
The indoor to outdoor NLOS path loss is as follows:

$$PL_{NLOS}^{in-out} = PL_1 + PL_{12} + PL_2$$
$$= PL_{NLOS}^{out}(d_{in,i} + d_{out,i}) + [14 + 15(1 - \cos(\vartheta))^2]$$

where $PL_1 = PL_{NLOS}^{out}$ is the outdoor NLOS path loss,
$PL_{12}$ is the path loss through wall as a function of the penetration angle,
$PL_2$ is the indoor path loss,
$h_{MS} = 1.5$, $h_{BS} = 3n_{floor} + 1.5$, $n_{floor}$ is the number of floors.
For each BS-MS pair $(s_i, m_i)$ of the LOS probability is as follows:

$$P_{LOS}^{in} = \begin{cases} 1, & \text{if } d_i \leq 2.5 \\ 1 - 0.9[1 - (1.24 - 0.61\log10(d_i))^3]^{1/3}, & \text{if } d_i > 2.5 \end{cases}$$

$$P_{NLOS}^{out} = e^{-d_i/200}$$

The path loss $H_{PL,i}$ for channel i is as follows:

$$H_{PL,i} = 10^{-\frac{1}{10} \circ (PL_{LOS} \circ 1\{\rho \leq P_{LOS}\} + PL_{NLOS} \circ 1\{\rho > P_{LOS}\})},$$

where $1\{\cdot\}$ is an indicator function, and $\rho$ is uniform in $[0,1]$.

Shadow Fading

Shadow fading is computed in step 314. Shadow fading, $H_{SF,i}$, is modeled by a log-Normal marginal distribution. Due to geographic coupling, shadow fading values of adjacent MSs are correlated. The correlation of shadow fading in dB is modeled by an exponential function of MS distance. Let $\Delta_{i,n}$ be the distance between MS $\mathbf{1}_i$ and MS $\mathbf{1}_n$, on channel i, n respectively. The covariance of shadow fading in dB (e.g., 10 log $10(H_{SF,i})$ and 10 log $10(H_{SF,n})$ is given by $$\text{cov}[10 \log 10(H_{SF,i}), 10 \log 10(H_{SF,n})] \sigma_{SF,i} \cdot \sigma_{SF,n} \cdot e^{-\Delta_{i,n}/d_{C,i,n}}, \quad (1)$$

where $\sigma_{SF,i}$ is the variance of shadow fading, and
$d_{C,in,n}$ is the correlation distance depending on the propagation scenario of the mobile station's $\mathbf{1}_i$ and $\mathbf{1}_n$ (i.e., indoor, outdoor, NOS, NLOS).

The correlation distances and variances for the different propagation scenarios are taken from Table 4-5.

Besides the geographic coupling cross channels, shadow fading $SF_i$ is also correlated with multi-path fading parameters of the same channel, which are delay spread and BS angle spread. The correlations are taken from Table 4-5. For example, if $D_i$ is the delay spread for channel i, then $$\text{cov}[\log 10(D_i), 10 \log 10(H_{SF,i})] = \sigma_{\log 10(D_i)} \cdot \sigma_{SF,n} \cdot \delta_i \quad (2)$$

where $\delta_i$ is the correlation of delay spread log 10 $(D_i)$ and shadow fading 10 log 10 $(H_{SF,i})$.

To generate shadow fading, delay spread, and BS angle spread for all channels subject to given correlations, the 3 $N_{channel}$ parameters are placed into matrix V as follows:

$$V = [10 \log 10(H_{SF,1}), \log 10(D_1), \log 10(E_1), \ldots, 10 \log 10(H_{SF,N_{channel}}), \log 10(D_{N_{channel}}), \log 10(E_{N_{channel}})]$$

where $E_i$ is the base angle spread in degree for channel i.

For any two elements in V, the covariance is given by equations (1) and (2) and the covariance matrix $M = \text{cov}[V, V^T]$. Let X be a vector of i.i.d. Gaussian variables with zero mean and unit variance. The parameter vector, V, is then $V = M^{1/2}X + \mu$, where $\mu$ is the mean of different parameters specified in Table 4-5. Matrix square root, $M^{1/2}$, can be computed through singular value decomposition. Shadow fading, $H_{SF,i}$, is then obtained from entry $V_{3 \cdot i}$ in parameter matrix V, which is represented as $H_{SF,i} = 10^{V_{3 \cdot i}/10}$.

Multi-Path Fading

Multi-path fading for channel i is determined in step 316. For multi-path fading, the modeled network is considered to have single antenna base stations and mobile stations. To model multi-path fading for channel i, $N_{cluster}$ clusters of rays are generated with $N_{ray,p}$ rays for cluster $p = 1, \ldots, N_{cluster}$.

Let $P_{p,q}$ be the power of ray q in cluster p,
$\tau_{p,q}$ be the delay of ray q in cluster p,
$\psi_{p,q}$ be the arrival or departure angle of the ray at BS $s_i$, and
$A_{BS,i}$ be the antenna pattern at BS $s_i$.

The time response of channel i due to multi-path fading is as follows:

$$H_{MF,i}(\tau) = \sum_{p=1}^{N_{cluster}} \sum_{q=1}^{N_{ray,p}} P_{p,q}^{1/2} \cdot A_{BS,s}(\Psi_{p,q}) \cdot e^{j\Phi_{p,q}} \cdot \delta(\tau - \tau_{p,q}),$$

where $\Phi_{p,q}$ is a random initial delay uniform in $[-\pi, \pi]$ and $\delta(\cdot)$ is the Dirac's delta function.

The base station's antenna radiation pattern used for each sector in a 3-sector cell site is given by:

$$A_{BS,s}(\phi) = -\min\left\{12\left(\frac{\phi}{\phi_{3dB}}\right)^2, A_m\right\},$$

where $-180 \leq \phi \leq 180$,
$\phi_{3dB}$ is the 3 DB beam width which corresponds to 70 degrees, and
$A_m = 20$ dB is the maximum attenuation.

For cluster p, the exponential-distributed auxiliary cluster delay is:

$\tau'_p = -r_i D_i \log(X_p)$, where $X_p$ is uniform in $[0,1]$ and $r_i$ is a scaling factor taken from Table 4-5.

For the case of NLOS, the auxiliary cluster delays are normalized by subtracting the minimum delay and sorting the result in descending order:

$$\tau_{p,q} = \text{sort}_\downarrow(\tau'_p - \min_p\{\tau'_p\}), \forall q.$$

For the case of LOS, the delays have to be scaled by a constant D to compensate for the effect of the LOS peak addition to the delay spread resulting in:

$$\tau_{p,q} = \frac{1}{D} \cdot \text{sort}_\downarrow(\tau'_p - \min_p\{\tau'_p\}), \forall q,$$

where $D=0.7705-0.0433K+0.0002K^2+0.000017K^3$ and is the heuristically determined Ricean K-factor dependent scaling constant, and K is the Ricean K-factor defined in Table 4-5.

Cluster powers are calculated assuming a single slope exponential power delay profile. The power assignments depend on the delay distributions defined in Table 4-5. Using the exponential delay distribution, the power for cluster p is as follows:

$$P'_p = e^{-\tau_p} \frac{r_i - 1}{r_i D_i} \cdot 10^{\frac{-Z_p}{10}},$$

where $Z_p$ is normally distributed with zero mean and variance ζ as defined in Table 4-5.

The power is averaged so that the aggregate sum of the power for all the clusters is equal to one. For the case of NLOS, then $$P_{p,q} = \frac{P'_p}{\sum_p P'_p}, \forall q$$

For the case of LOS, an additional specular component is added to the first cluster resulting in the following:

$$P_{p,q} = \frac{1}{K+1} \cdot \frac{P'_{p-1}}{\sum_p P'_p} + \frac{K}{K+1} \cdot 1_{\{p=1\}},$$

∀ q, where K is the Ricean K-factor defined in Table 4.5 converted to linear scale.

The BS angles are determined by applying the inverse Gaussian function with input parameters $P_{p,q}$, and BS angle spread $E_i$, resulting in the following:

$$\psi'_p = \frac{2E_i}{C} \sqrt{-\ln \frac{P_{p,q}}{\max_{p,q} P_{p,q}}},$$

where the choice of q does not affect the result, since $P_{p,q}$ is the same for every p.

In the NLOS case, constant C is a scaling factor related to the total number of clusters and taken from the WINNER II scaling factor table. In the LOS, additional scaling of angles is required to compensate for the effect of LOS peak addition to the angle spread. Constant C is dependent on the Ricean K-factor $C=C' \cdot (1.1035-0.028K-0.002K^2+0.0001K^3)$, where K in dB is the Ricean K-factor and C' is the scaling constant for the NLOS case.

Next, a positive or negative sign is assigned to the angles by multiplying with a random variable $X_p$ with Bernoulli distribution to set of {−1, 1} and to add component $$Y_n \sim N\left(0, \frac{\psi_p}{5}\right)$$

to introduce random variation resulting in $\psi_p = X_p \psi'_p + Y_n + \phi_i$, where $\phi_i$ is the arrival or departure angle of channel i at base station $BS_{s_i}$.

In the LOS case, the equation is substituted by the following equation to enforce the first cluster in the LOS direction:

$$\psi_p = (X_p \psi'_p + Y_n + \phi_i) - (X_p \psi'_1 + Y_1 + \phi_i).$$

Next offset angles $a_q$ from Table 4-1 are added to the cluster angles producing:

$\psi_{p,q} = \psi_{p,q} + c_{AOA} \cdot a_m$, where $c_{AOA}$ is the cluster-wide rms zimuth spread of arrival or cluster ASA from Table 4-5.

Finally, for the two strongest clusters, such as p=1 and p=2, rays are spread in delay to three sub-clusters per cluster with fixed delay offset and power scaling for each ray (as in Table 4-2). Let $\Phi_{p,q}$ be a random initial delay uniform in [−π, π]. Thus, the multi-path fading for channel i is as follows:

$$H_{MF,1}(\tau) = \sum_{p=1}^{Ncluster} \sum_{q=1}^{Nray,p} P_{p,q}^{1/2} \cdot A_{BS,s}(\Psi_{p,q}) \cdot e^{j\Phi_{p,q}} \cdot \delta(\tau - \tau_{p,q}).$$

CIR and Channel Attenuation

Next, in step 318, the channel impulse response to channel i is determined as follows:

$$H_i(\tau) = H_{AG,i} \cdot H_{PL,i} \cdot H_{SF,i} \cdot H_{MF,i}(\tau).$$

Once the channel impulse response is calculated, in step 320, the channel attenuation for each subcarrier $f_k$ in the frequency domain through application of the Fourier transform on $H_i(\tau)$ as follows:

$$H_i(f_k) = \int_0^\infty H_i(\tau) e^{-j\pi f_k \tau} d\tau,$$

where $f_k$ is the center frequency for subcarrier k.

Steps 310-320 are repeated for each channel i. At the end of the last iteration, the channel attenuation matrix H is completed and this phase of the processing is completed.

Attention now turns to a description of the steps used in the resource scheduling and power allocation procedure 104.

Resource Scheduling and Power Allocation Formulation

The resource scheduling and power allocation procedure 104 is used to determine which user to schedule in a PRB and what transmit power to use for the scheduled user while maximizing certain fairness utility functions.

Table 2 below lists key mathematical notations and their meaning as used herein.

Consider a LIE network with n femtocell and macrocell base stations serving m mobile users. Let $b_i$ denote the base stations (BS) serving mobile user i for i=1, . . . , m.

Let $C_i = \{j:b_j \neq b_i, \forall j\}$ represent the set of users who are possibly interfering with user i since users within the same cell are assigned orthogonal resources.

Let the set of users served by base station k be $B_k = \{j:b_j=k, \forall j\}$. A user is allocated a physical resource block (PRB) which is a group of a specific number of subcarriers for a specific amount of time. PRBs have both a time and frequency dimension. Each PRB has the size of 180 kHz in the frequency domain and 0.5 ms in the time domain. Thus, a physical channel is partitioned into T×F blocks, such that the total network bandwidth is (F·180) kHZ and the time scale of the dynamic resource allocations is (T·0.5) ms.

Let $P_{i,t,f}$ be the transmit power of user i on PRB (t,f) and $S_{i,t,f} = 1_{\{P_{i,t,f}>0\}}$, ∀ i,t,f is the binary indicator of whether PRB (t, f) is assigned to user i.

All channel attenuations are stored in matrix H, all transmit power in matrix P, and assignment decisions in S. The data rate of user i is given by a function of channel and power, as follows:

$$R_i = f_{R_i}(H, P, S) = \sum_{t=1}^{T} \sum_{f=1}^{F} \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right), \forall i$$

where $N_{b_i}$ is the thermal noise power at BS $b_i$ and $\Gamma$ is an SINR gap, reflecting the loss over modulation and error control coding.

Problem 1

Thus, the problem can be stated mathematically as follows:

$$\text{Maximize} \sum_{i=1}^{m} U(R_i), \quad (1)$$

Subject to $R_i =$ $$\sum_{t=1}^{T} \sum_{f=1}^{F} \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right), \forall i$$

$$\sum_{t=1}^{T} \sum_{f=1}^{F} P_{i,t,f} \leq P_{max,i}, \forall i$$

$$S_{i,t,f} \in \{0, 1\}, \forall i, t, f$$

$$\sum_{i \in B_k} S_{i,t,f} = 1, \forall t, f, k$$

Variables $P_{i,t,f}, S_{i,t,f}$ where $P_{max,i}$ is a maximum transmit power constraint for user i, $$\sum_{i \in B_k} S_{i,t,f} = 1, \forall t, f, k,$$

ensures that each PRB is assigned a single user within each cell, and U (•) is the utility function.

The utility function, U (•), is used to capture various design objectives, such as throughput efficient and allocation fairness. In one embodiment the utility function, U (•), can be from the family of widely applied α-fair utilities, $$\sum_{i} U_\alpha(x_i), \text{ where } U_\alpha(x) = \begin{cases} \frac{x^{1-\alpha}}{1-\alpha}, & \alpha \geq 0, \alpha \neq 1 \\ \log(x), & \alpha = 1 \end{cases}$$

The α-fair utilities model was chosen as a tradeoff between throughput efficient and allocation fairness. A maximize of the α-fair utility function satisfies the definition of α-fairness: a maximization of the log utility function (α=1) is proportionally fair, and a maximization of the α-fair utility function with α→∞ is max-min fair.

The resource allocation problem formulated above is NP-hard due to the integer constraints placed on $\{S_{i,t,f}, \forall i, t, f\}$.

Thus, it can be decomposed into two sub-problems, Problem 1A and Problem 1B, as described below.

Problem 1A

Problem 1A is the power optimization over P for fixed scheduling S and is represented mathematically as follows and which is solved for all users jointly:

$$\text{Maximize} \sum_{i=1}^{m} U(R_i),$$

Subject to $R_i = \sum_{f=1}^{F} \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right), \forall i$ $$\sum_{f=1}^{F} P_{i,f} \leq P_{max,i}, \forall i$$

Variables $P_{i,f}$

In LTE networks, since interference (in the denominator of the rate function above) only comes from users in neighboring cells, the problem can be further decomposed across cells that reduce the amount of message-passing among different cells. The problem then becomes a standard (iterative) waterfilling problem and maximizes rates $R_i$ for all users i=1, ..., m independently and is as follows:

Maximize $R_i$

Subject to $R_i = \sum_{f=1}^{F} \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right), \forall i$ $$\sum_{f=1}^{F} P_{i,f} \leq P_{max,i}, \forall i$$

Variables $P_{i,f}$ where the utility function U(•) is omitted due to its monotonicity over $R_{b_i}$.

Let $\lambda_i$ be the Lagrangian multiplier for the transmit power constraint of user i. Then the Lagrangian for the power control problem of user i is as follows:

$$L(P_{i,f}, \lambda_i) = \sum_{f=1}^{F} \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right) -$$

This is a convex optimization whose solution can be given in close form using the Karush-Kuhn-Tucker (KKT) conditions as described below.

Solution 1A

Therefore, the solution to Problem 1A is as follows:

$$P_{i,f}^*(\lambda_i) = \left\{\left(\frac{1}{\lambda} - \frac{\Gamma\left(\sum_{j \in C_i} H_{b_i,i,f}^2 P_{i,f} S_{i,f} + N_{b_i}\right)}{H_{b_i,i,f}^2}\right)^+ \atop 0, \right.$$

where $(x)^+=\max(x,0)$ is a projection to the set of non-negative numbers, and $$\frac{1}{\lambda_i}$$

is the water level satisfying $$\sum_{f=1}^{F} P_{i,f}^*(\lambda_i) \leq P_{max,i}$$

Thus, the solution to Problem 1A is equivalent to determining the water-level for each user. Once water-levels are known, a set of transmit power and potential data rates of assigning PRB f to different users can be computed as follows:

$$r_{i,f}(\lambda) = \log\left(1 + \frac{1}{\Gamma} \cdot \frac{H_{b_i,i,t,f}^2 P_{i,t,f} S_{i,t,f}}{\sum_{j \in C_i} H_{b_i,i,t,f}^2 P_{j,t,f} S_{j,t,f} + N_{b_i}}\right)$$

Rate $r_{i,f}(\lambda)$ is the potential data rate that user i can achieve on PRB (t,f) (independent of the scheduling), and only depends on parameter ($\lambda$).

Problem 1B

For a set of fixed water levels $$\frac{1}{\lambda_i},$$

Problem 1 can be reduced to a scheduling problem of assigning PRBs to users as follows:

$$\text{Maximize } \sum_{i=1}^{m} U(R_i),$$

$$\text{Subject to } R_i = \sum_{f=1}^{F} S_{i,f}' r_{i,f}(\lambda)$$

$$S_{i,f} \in \{0, 1\}, \forall i, f$$

$$\sum_{i \in B_k} S_{i,f} = 1, \forall i, f$$

Variables $S_{i,f}$

If the utility is linear in $R_i$, Problem 1B becomes a maximal weighted bipartite matching problem in graph theory and can be solved by a modified version of the Hungarian algorithm with polynomial complexity $F^3$. Using a standard optimization technique, the integer constraint $S_{i,f} \in \{0, 1\}$ is relaxed to a continuous constant $0 \leq S_{i,f} \leq 1$, so that each BS needs to solve the following problem:

$$\text{Maximize } \sum_{i \in B_k} U(R_i) \quad (3)$$

-continued $$\text{Subject to } R_i = \sum_{f=1}^{F} S_{i,f}' r_{i,f}(\lambda)$$

$$0 \leq S_{i,f} \leq 1, \forall i, f$$

$$\sum_{i \in B_k} S_{i,f} = 1, \forall i, f$$

Variables $S_{i,f}$

Next, the solution is projected to the space of binary scheduling decisions, satisfying $$S_{i,f} \in \{0, 1\} \text{ and } \sum_{i \in B_k} S_{i,f} = 1.$$

The following family of fairness measures developed through axiomatic theory $$F(x_1, \ldots, x_m) = \left[\sum_{i=1}^{m} \left(\frac{x_i}{\sum x_i}\right)^{1-\beta}\right]^{\frac{1}{\beta}}$$

is applied to find the physical resource block with the most biased or unfair scheduling vector $$f^* = \arg\min_f F(\{S_{i,f} | i \in B_k\}), \forall k.$$

Physical resource block (t, f) is then assigned to the user with the largest element of $\{S_{i,f} | i \in B_k\}$. To assign all physical resource blocks, the above procedure is repeated. In each iteration an updated equation of (3) is solved with the current PRB assignments. The solution is summarized as follows:

Solution 1B

```
while i < m
{ solve equation (x) to obtain S_{i,f}* = 1 {Si,f* = max i Si,f* }
    find the most biased scheduling f* = arg min_f F ({ S_{i,f} | i ∈ B_k }), ∀k
    assign S_{i,f}* = 1 {Si,f* = max i Si,f* }
    i = i + 1
} repeat
```

Figure 6:
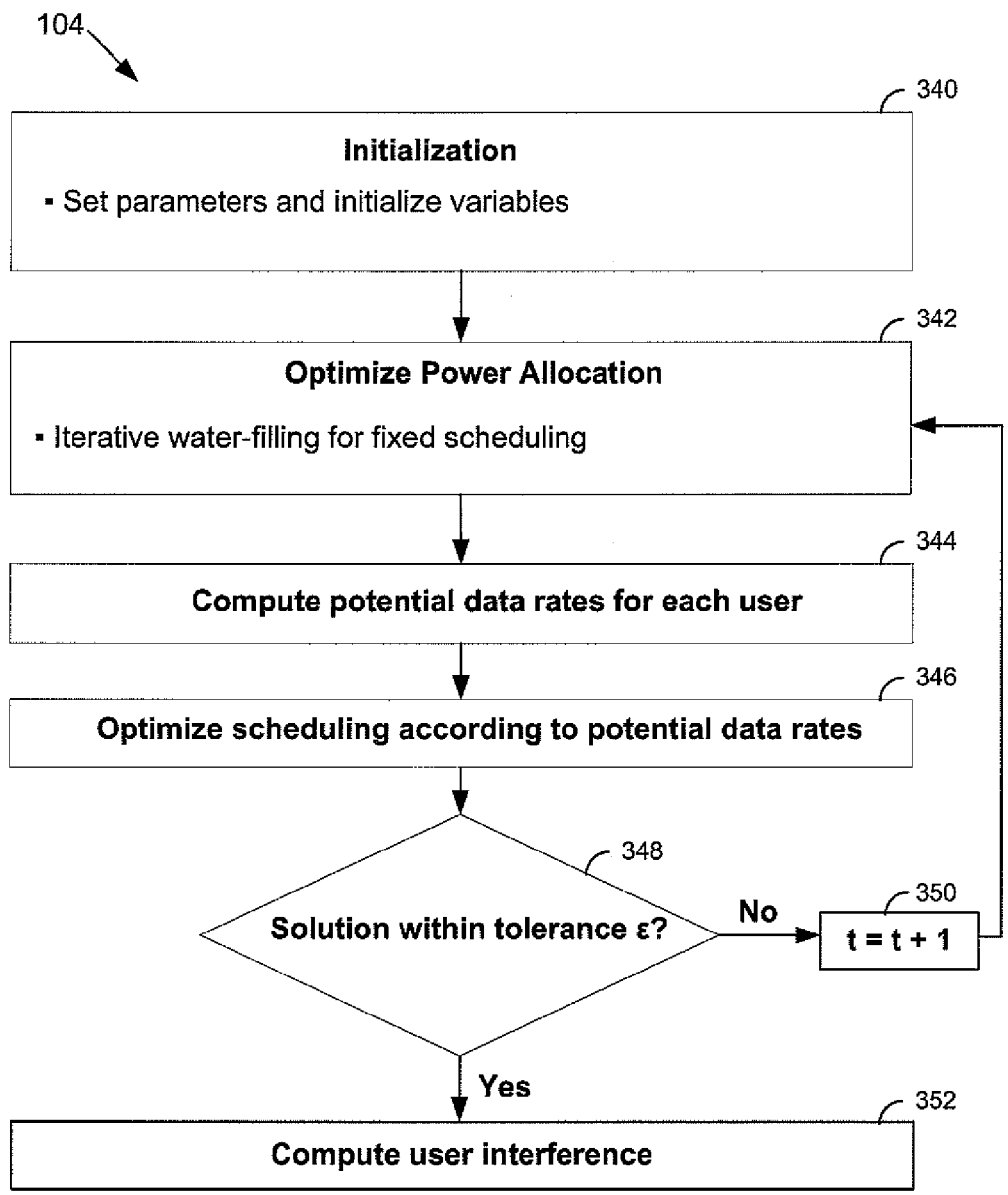
FIG. 6 is a flow chart of the steps used in the resource scheduling and power allocation procedure in accordance with an embodiment.

Attention now turns to FIG. 6 which illustrates the steps used in the scheduling and power allocation optimization procedure 104.

The procedure 104 starts by initializing certain parameters and variables (step 340). For example, the maximum power budget for each mobile user i, $P_{max,i}$, is set to user-defined values. The tolerance $\epsilon$ is set to a user-defined value and the iteration variable is initialized, t=0. The user scheduling function $S_{i,t,f}$ is initialized to 1, $\forall$ i, t, f.

At step 342, iterative water-filling is used to determine the power allocation using fixed scheduling and a uniform initial power allocation where users evenly split the power to all subcarriers. The power allocation can be calculated as follows:

$$\text{while} \sum_{i,f} |P_{i,f}[t+1] - P_{i,f}[t]| > \epsilon$$

for i = 1 to m $$P_{i,f}[t+1] = \begin{cases} \left( \frac{1}{\lambda} - \frac{\Gamma\left(\sum_{j \in C_i} H^2_{b_{i,i,f}} P_{i,f} S_{i,f} + N_{b_i}\right)}{H^2_{b_{i,i,f}}} \right)^+ \\ 0, \end{cases}$$

update $\lambda_i$ until $\sum_{f}^{F}$ until $P_{i+f}[t+1] \leq P_{max,i}$ end for
end while Next, in step 344, initial potential data rates are determined as follows:

$$r_{i,f}(\lambda) = \log\left(1 + \frac{1}{\Gamma} \cdot \frac{H^2_{b_{i,i,t,f}} P_{i,f} S_{i,t,f}}{\sum_{j \in C_i} H^2_{b_{i,i,t,f}} P_{j,t,f} S_{j,t,f} + N_{b_i}}\right), \forall i, f$$

In step 346, the scheduling is updated according to the potential data rates. Fairness is considered in this step by matching users and subcarriers for maximum fairness. This is determined as follows:

while j > 0

$$\text{while} \sum_{i,f} |S_{i,f}[t+1] - S_{i,f}[t]| > \varepsilon$$

$$S_{i,f}[t+1] = S_{i,f}[t] + \delta\{r_{i,f}[t+1] \cdot U'\left(\sum_f S_{i,f}\right)$$

Project $S_{i,f}[t+1]$ to $\{S_{i,f} \in \{0,1\}, \sum_{i \in B_k} S_{i,f} = 1$ end while
Find $f^* = \arg\min_f F(\{S_{i,f} | i \in B_k\}), \forall k$,
Assign $S_{i,f^*} = 1_{\{S_{i,f^*} = \max_i S_{i,f^*}\}}$
end while end while Next in step 348, a determination is made as to whether the solution, $S_{i,t,f}$ is within tolerance $\epsilon$. If the solution is not (step 348—no), then steps 342 through 348 are repeated for the next time slot, t+1, which is incremented, t=t+1, in step 350.

At the completion of the scheduling and resource allocation, in step 352, the user interference I is calculated. The user interference that a user i suffers from all other users, j≠i, at time t and frequency f is calculated as follows:

$$I_{i,t,f} = \sum_{j \neq i} H^2_{b_j,j,t,f} P_{j,t,f} S_{j,t,f} + N_{b_i},$$

where $N_{b_i}$ is the noise at base station $b_i$.

Upon the completion of step 353, the resource scheduling and power allocation procedure 104 is completed. Turning to FIG. 1, the next step is to execute the discrete-event simulation procedure 106. The discrete-event simulation procedure 106 can be any discrete-event simulation software program. The simulation procedure uses the data from the LTE air interface model procedure 102 and the resource scheduling and allocation procedure 104 to simulate the packet-by-packet transmission of data from the mobile user i to mobile user j in a LIE network environment integrated with femtocells.

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Although the embodiments have been described in the context of a LTE network containing femtocells, it will be understood that this context is for illustration purposes only and that the technology described herein can be applied to radio communications in general and to communication systems adhering to other wireless or communication standards.

In addition, various modifications to the network parameters can be made to study the impact on the behavior of the network. In fact, the scheduling and power allocation procedure can be viewed as a function whose output gives a solution subject to a fairness constraint as follows:

$(P,S)=\phi(H,P_{max})$.

For a given channel attenuation and maximum transmit power budget, the scheduling and power allocation procedure gives a feasible power allocation P, which tends to optimize the fairness constraint. Different allocation algorithms achieve a tradeoff between complexity and optimality. Examples of such tradeoff variables can be the utility function, the maximum transmit power budget, the total bandwidth usage, the number of antennas at a macrocell base station, the number or density of macrocells, the number or density of femtocells, the computational complexity of the algorithm, φ, measured in CPU cycles, and the gap of achievable utility to optimal utility algorithm, φ. Degree of design freedoms can include the transmit power of a mobile user on a PRB, the scheduling decision of a PRB to a mobile user, the assignment of a base station to a mobile user, and the scheduling and power allocation procedure.

TABLE 1

Key Notations Used in LTE Air Interface Model

| Notation | Meaning |
|---|---|
| MS | Mobile station |
| BS | Base station |
| $N_{site}$ | Total number of sites |
| $N_{UE, in}$ | Number of indoor user equipment |
| $N_{UE, out}$ | Number of outdoor user equipment |
| $N_{UE}$ | Total number of user equipment |
| $N_{house}$ | Number of houses |
| i | Channel |
| $s_i$ | Base station of channel i |
| $m_i$ | Mobile station of channel i |
| $d_i$ | Distance from BS $s_i$ to MS $m_i$ |
| $\phi_i$ | Departure angle at the BS |

TABLE 1-continued

Key Notations Used in LTE Air Interface Model

| Notation | Meaning |
|---|---|
| $d_{out,i}$ | Distance from base station $s_i$ to the wall next to the location of $m_i$ |
| $d_{in,i}$ | Perpendicular distance from the wall to $m_i$ |
| $\phi_i$ | Angle between the Line-Of-Sight (LOS) to the wall and a unit vector normal to the wall |

TABLE 2

Key Notations Used in the Scheduling and Power Allocation

| Notation | Meaning |
|---|---|
| N | number of femtocell and macrocell base stations in an LTE network |
| m | number of mobile users |
| k | number of base stations |
| BS | base station |
| $b_i$ | base station serving mobile user i |
| $C_i$ | set of users who are possibly interfering with user i |
| $B_k$ | set of users served by base station k |
| D | set of deployment parameters |
| $f_H(\cdot)$ | channel generating function |
| t | time unit |
| f | frequency unit |
| PRB(t, f) | Physical Resource Block (time, frequency) |
| $H_{b_i, i, t, f}$ | channel attenuation from user i to base station $b_i$ for PRB (t, f) |
| $P_{i,t,f}$ | transmit power of user i on PRB(t,f) |
| H | matrix of all channel attenuations |
| P | matrix of all transmit power |
| S | matrix of all assignment decisions |
| $R_i$ | data rate of user i |
| $N_{b_i}$ | thermal noise power at base station $b_i$ |
| Γ | SINR gap |
| $S_{i,t,f}$ | binary indicator of whether PRB (t, f) is assigned to user i |
| $U(\cdot)$ | utility function |

What is claimed is:

1. A method comprising:
generating a wireless network model of a wireless network based at least in part on long term evolution (LTE) specifications, wherein the wireless network model includes a plurality of physical resource blocks (PRBs), wherein the plurality of PRBs are associated with a plurality of time units, a plurality of subcarriers, a plurality of base stations, and a plurality of channels;
determining channel attenuations for the plurality of channels; assigning a plurality of mobile devices a PRB so that a data rate of a mobile device is in accordance with a fairness objective; and simulating transmission of data from a first mobile device to a second mobile device using the wireless network model with the assigned PRB.

2. The method of claim 1, wherein the assigning further comprises:
using a water-filling technique to determine a water level for the mobile device as a function of channel attenuations and transmit power; and
calculating a set of data rates for the mobile device and for the PRB as a function of the water levels.

3. The method of claim 1, wherein the fairness objective is an α-fair utility function.

4. The method of claim 1, wherein at least one of the plurality of base stations comprises a femtocell.

5. The method of claim 1, further comprising determining power allocations for the mobile devices as a function of the channel attenuations.

6. The method of claim 5, wherein the data rate for the mobile device is determined as a function of the power allocations.

7. A non-transitory computer-readable medium having instructions stored thereon, the instructions comprising:
instructions to generate a radio air interface that includes a plurality of mobile devices, a plurality of base stations, a subset of base stations including femtocells, and a plurality of resource units, wherein a resource unit includes a plurality of time slots and subcarrier frequencies and a plurality of channels;
wherein the radio air interface is based at least in part on long term evolution (LTE) specifications;
instructions to generate resource unit assignments, wherein a resource unit assignment assigns a mobile device to a resource unit to provide a data rate for the mobile device in accordance with a fairness objective; and
instructions to simulate transmission of data using the radio air interface in accordance with the resource unit assignments.

8. The non-transitory computer-readable medium of claim 7, further comprising:
instructions to determine channel attenuations for the plurality of channels and the plurality of resource units;
instructions to allocate power allocations for the mobile device as a function of the channel attenuations, and a power budget for the mobile device prior to assigning the mobile device to the resource unit; and,
instructions to compute the data rate for the mobile device as a function of the power allocations.

9. The non-transitory computer-readable medium of claim 7, wherein the fairness objective is an α-fair utility function.

10. The non-transitory computer-readable medium of claim 7, wherein the resource unit is a physical resource block (PRB).

11. The non-transitory computer-readable medium of claim 7, further comprising instructions to use a water-filling technique to determine a water level for the mobile device as a function of channel attenuations and transmit power.

12. The non-transitory computer-readable medium of claim 11, further comprising instructions to calculate the data rate as a function of the water level.

13. An apparatus comprising:
a memory; and
a processor operatively coupled to the memory and configured to:
identify a plurality of resource units, wherein a resource unit includes a set of time units and subcarriers;
determine a maximum data rate for a mobile device in a wireless network that includes a plurality of mobile devices, wherein the maximum data rate is determined based at least in part on channel attenuations associated with channels for the resource unit, and wherein the determining is independent of assignments of the mobile devices to physical resource blocks (PRBs);
assign a mobile device to a PRB based at least in part on the maximum data rate for the mobile device, wherein the assigning is also based at least in part on a fairness constraint for all of the mobile devices; and
simulate data packet transmissions between the mobile device and a second mobile device in accordance with the PRB assigned to the mobile device, wherein the mobile device transmits through a femtocell base station and the second mobile device transmits through a long term evolution (LTE)-based base station.

14. The apparatus of claim 13, wherein the fairness objective is an α-fair utility function.

15. The apparatus of claim 13, wherein the plurality of resource units comprise physical resource blocks (PRBs).

16. The apparatus of claim 13, wherein the processor is further configured to determine a power allocation for the mobile device as a function of the channel attenuations.

17. The apparatus of claim 16, wherein the maximum data rate for the mobile device is determined as a function of the power allocation.

* * * * *

UNITED STATES PATENT AND TRADEMARK OFFICE
CERTIFICATE OF CORRECTION

PATENT NO.      : 8,509,166 B2  
APPLICATION NO. : 12/695661  
DATED           : August 13, 2013  
INVENTOR(S)     : Kerpez et al.

Page 1 of 1

It is certified that error appears in the above-identified patent and that said Letters Patent is hereby corrected as shown below:

On the Title Page, item (56), under "OTHER PUBLICATIONS", in Column 2, Line 14, delete ""upink capactiy" and insert -- "uplink capacity --, therefor.

On Title Page 2, item (56), under "OTHER PUBLICATIONS", in Column 1, Lines 1-7, delete "Lui, R., et al., "Low Complexity Near-Optimal Spectrum Balancing Ericsson, "LTE-an introduction", Ericsson Technical Report 284 23-3124, Uen Rev B, available at www:ericsson:com=technology=whitepapers=lteoverview:pdf, Jun. 2009. for Digital Subscriber Lines", Proceedings of IEEE International Conference on Communications (ICC), Seoul, Korea, May 2005." and insert -- Ericsson, "LTE-an introduction", Ericsson Technical Report 284 23-3124, Uen Rev B, available at www:ericsson:com=technology=whitepapers=lteoverview:pdf, Jun. 2009. Lui, R., et al., "Low Complexity Near-Optimal Spectrum Balancing for Digital Subscriber Lines", Proceedings of IEEE International Conference on Communications (ICC), Seoul, Korea, May 2005. --, therefor.

On Title Page 2, item (56), under "OTHER PUBLICATIONS", in Column 2, Lines 27-28, delete "Terrestria" and insert -- Terrestrial --, therefor.

In the Specifications

In Column 2, Line 20, delete "delays;" and insert -- delays, --, therefor.

In Column 10, Line 50, delete "LIE" and insert -- LTE --, therefor.

In Column 16, Line 6, delete "LIE" and insert -- LTE --, therefor.

Signed and Sealed this  
Twenty-fifth Day of March, 2014

Michelle K. Lee  
*Deputy Director of the United States Patent and Trademark Office*